W. A. D. ALLPORT & T. J. W. C. DAVENPORT.
MACHINE FOR EXTRACTING ESSENTIAL OILS FROM CITRUS FRUITS.
APPLICATION FILED DEC. 17, 1910.
1,002,020.
Patented Aug. 29, 1911.
2 SHEETS—SHEET 1.
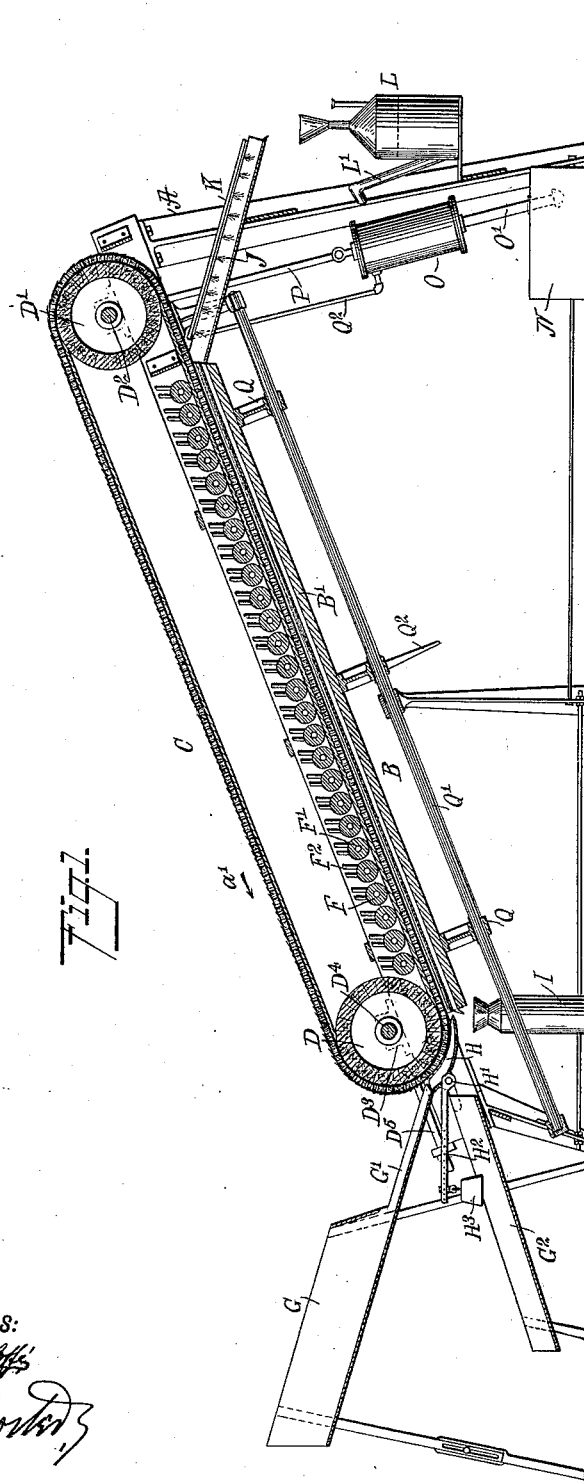
WITNESSES:
INVENTORS
Walter A. D. Allport
Thomas Joseph W. C. Davenport
BY
ATTORNEYS

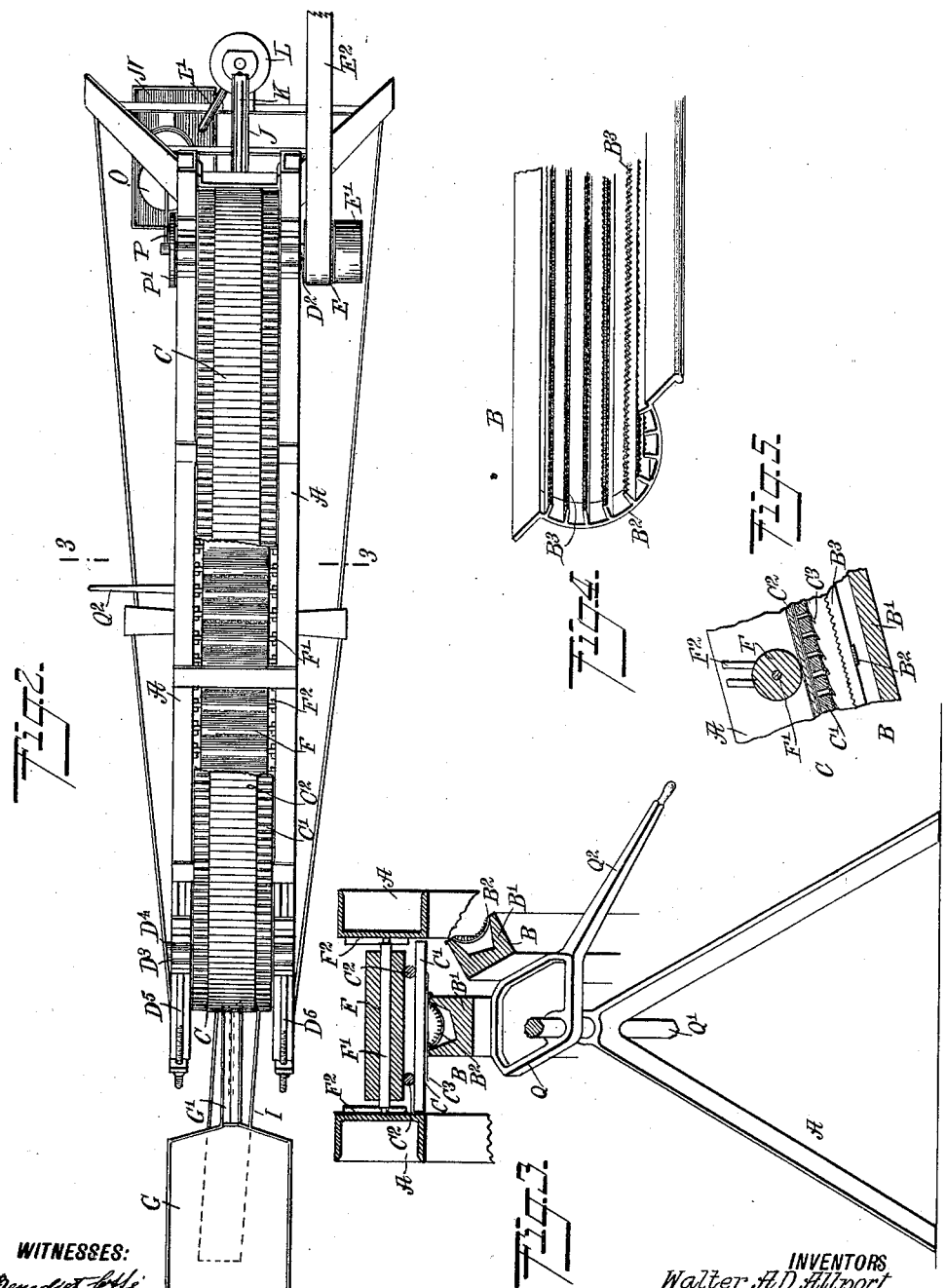

UNITED STATES PATENT OFFICE.

WALTER ADOLPH DENISON ALLPORT AND THOMAS JOSEPH WILLIAM CRAMOND DAVENPORT, OF ROSEAU, DOMINICA, BRITISH WEST INDIES.

MACHINE FOR EXTRACTING ESSENTIAL OILS FROM CITRUS FRUITS.

1,002,020. Specification of Letters Patent. Patented Aug. 29, 1911.

Application filed December 17, 1910. Serial No. 597,798.

*To all whom it may concern:*

Be it known that we, WALTER A. D. ALLPORT and THOMAS JOSEPH W. C. DAVENPORT, both subjects of the King of Great Britain, and residents of Roseau, Dominica, British West Indies, have invented a new and Improved Machine for Extracting Essential Oils from Citrus Fruits, of which the following is a full, clear, and exact description.

The object of the invention is to provide a new and improved machine for extracting essential oils from the outer rind of citrus fruits, such as oranges, lemons, limes, etc., and arranged to insure a continuous operation thus permitting the handling of a large number of fruits in a given time, and insuring complete extraction and gathering of the oil without injury to the fruits.

For the purpose mentioned use is made of a traveling pressing device and a puncturing device held stationary relative to the said pressing device, the devices being arranged for the fruits to be rolled along between the same for puncturing and pressing the cells in the outer skins of the fruits to expel the oil contained in the cells.

A practical embodiment of the invention is represented in the accompanying drawings forming a part of this specification, in which similar characters of reference indicate corresponding parts in all the views.

Figure 1 is a sectional side elevation of the extracting machine; Fig. 2 is a plan view of the same, parts being broken out; Fig. 3 is an enlarged transverse section of the same on the line 3—3 of Fig. 2; Fig. 4 is an enlarged perspective view of the puncturing device; and Fig. 5 is an enlarged sectional side elevation of part of the machine.

On a suitably constructed frame A are arranged two oppositely-disposed devices B and C, of which the device B is held stationary relative to the device C, and is provided with puncturing means, while the device C is preferably in the form of an endless slat belt having its lower run in close proximity to and parallel with the puncturing device B, so that the fruits can pass between the said devices and be rolled along the same by the action of the lower run of the slat belt and which lower run also presses the fruits into engagement with the puncturing devices of the device B, so that the cells in the outer skin of the fruit are punctured, and the oil contained in the said cells is pressed out.

The puncturing device B is provided with a trough B', across the top of which extends a grate $B^2$, segmental in cross section, and provided with longitudinally-extending ribs $B^3$, serrated at their upper edges so as to minutely puncture the outer skin of the fruit as the latter are rolled along the grate $B^2$ by the action of the lower run of the endless slat belt. The grate $B^2$ is preferably hinged to one side of the trough B' so as to permit of swinging the grate into an open position for cleaning and other purposes. The slat belt of the pressing and moving device C passes around drums D and D', journaled in suitable bearings on the main frame A, and the shaft $D^2$ of the drum D' is provided with fast and loose pulleys E and E', over which passes a belt $E^2$ connected with suitable machinery for imparting a rotary motion to the drum D', to cause the slat belt to travel in the direction of the arrow $a'$. As shown in Fig. 1, the puncturing device B and the pressing and moving device C are arranged in inclined positions, so that the fruits are rolled upward between the lower run of the slat belt and the ribs $B^3$ of the puncturing device B. The slat belt has its slats C' attached to ropes, chains or similar flexible connections $C^2$, and on the outer face of each slat C' is secured a pressing plate $C^3$, overlapping at one side the pressing plate of the next adjacent slat so as to provide a continuous but flexible surface, as will be readily understood by reference to Figs. 1, 2 and 5. In order to press the fruits with sufficient force in contact with the serrations $B^3$ of the puncturing device B, with a view to puncture the cells in the outer skins of the fruits and to press the oil contained in the said cells out of the same, use is made of rollers F bearing down on the lower run of the endless slat belt, the said rollers F having their shafts F' journaled in elongated vertical bearings $F^2$ attached to the frame A, so that the rollers F are free to turn and to move up and down to allow the lower run of the slat belt C to flex sufficiently for accommodating larger and smaller fruits, at the same time pressing the fruits with the desired force into contact with the puncturing means.

In order to feed the fruits between the devices B and C at the lower ends thereof, the following arrangement is made: The fruits are placed in an inclined hopper G having an outlet chute G' of a width corresponding approximately to the diameter of the largest fruit to be handled so that the fruits pass singly, that is, one behind the other down the chute G' and into a shoe H made segmental and extending around the lower portion of the slat belt at the drum D, the forward end of the shoe reaching to the entrance between the devices B and C. The shoe H is hinged at H' and is provided with a rearwardly-extending arm H², carrying an adjustable weight H³ to swing the shoe H toward the peripheral surface of the slat belt at the drum D, with a view to cause a forward feeding of the fruits along the shoe H and into the space between the segmental grate B² and the pressing plates C³ of the slat belt. Below the chute G' is arranged a second chute G² inclined downwardly and rearwardly and of a width in excess of that of the narrow chute G', so that if a fruit passes to one side of a preceding one while in the chute G', such fruit will drop over the side edge of the chute G' and drop into the chute G², which delivers such discharged fruit to the rear of the machine to be replaced into the hopper G. The fruits in their passage between the puncturing device B and the pressing and moving device C are rolled along, so that the entire peripheral face of each fruit is punctured to insure complete extraction of the essential oil, which latter drops down between the ribs B³ into the trough B', to flow down the same and finally pass from the lower end of the trough B' into a receptacle I. The fruits in their forward movement between the devices B and C finally leave the upper end of the grate B² and then drop into a chute J, which delivers the fruits at the front end of the machine into a basket or other suitable receiving means. The fruits while passing down the delivery chute J are subject to the action of jets of water issuing through a jet pipe K, arranged over the chute J, so that the oil that may adhere to the outer surfaces of the fruits is washed off, and the oil and water finally leave the chute J at the lower end thereof and pass into a vessel L supported on the main frame A, as indicated in Fig. 1.

It is understood that the fruits passing down the chute J have sufficient momentum to clear the vessel L, while the water and oil flowing down the chute J readily pass into the vessel L. In this vessel the water and oil separate, with the oil standing on top of the water. The vessel L is provided with a discharge spout L' extending from near the lower end of the vessel to within a distance from the top thereof, so that the water passing into the vessel L can flow out through the spout L' and pass into a tank N, while the oil remains in the vessel L and is removed from the same from time to time.

The water passing into the tank N is used over and over again for spraying purposes in the pipe K, and for this purpose a pump O is provided, mounted on the main frame A, and having its suction pipe O' extending into the tank N. The discharge pipe O² of the pump O is connected with the spraying pipe K and the pump O is actuated from the shaft D² by a connecting rod P and crank disk P', which latter is secured on the shaft D². Thus when the machine is running the pump O is actuated and consequently the water for spraying purposes is continually circulated.

It is understood that a certain amount of oil passing into the vessel L remains in suspension in the water, and as the same water is used over and over again and the water can only hold a certain amount of the oil in suspension, it is evident that after the water has reached the saturated point all further oil is immediately liberated and rises to the upper portion of the separating vessel L.

In practice it has been found advantageous to provide two or more puncturing devices B, any one of which can be moved into operative position relative to the pressing and moving device C. For this purpose the puncturing devices B are mounted on a frame Q attached to a shaft Q', journaled in suitable bearings on the main frame A, and on the said frame Q is secured a handle Q² for turning the frame Q, so as to bring either of the puncturing devices B into active position relative to the device C. The puncturing device B not in use at the time can be readily cleaned so as to be in proper condition for use at any time.

The operation is as follows: When the machine is running and the hopper G is filled with the citrus fruit, then the latter are fed singly by the shoe H between the ribs B³ and the pressing plate C³, which latter by the forward movement roll the fruits along and by the weighted rollers F press the fruits with sufficient force into contact with the serrations of the ribs B³ to minutely puncture the cells in the outer skin, the pressure also forcing the oil contained in the said cells out of the same, so that the oil drops into the trough B' and flows down the same into the receiving vessel I.

It is understood that a sufficient amount of flexibility is given to the endless slat belt to prevent injury to the fruits by crushing the same, at the same time accommodating fruits of larger and smaller diameters.

In practice, the bearings D³ for the shaft D⁴ of the drum D are made adjustable by the use of screw rods D⁵, so that the operator is enabled to give the desired flexibility to the endless slat belt.

The punctured fruits finally leave the upper end of the grate B² and roll down the chute J, and during the passage of the fruits down the chute J they are subjected to the action of the jets of water emanating from the pipe K, so that the oil adhering to the surface of the fruits is washed off and flows with the water into the vessel L while the fruits pass to a suitable receiving device.

The machine shown and described is very simple and durable in construction and capable of handling a large number of fruits, as the operation can be carried on continuously.

It is understood that the fruits on leaving the machine are practically without injury, that is, the pulp and juice of the fruits are left intact, and such fruits as lemons and limes can be utilized for the manufacture of citric acid although they are useless for shipping as the injury to the oil cells impairs the keeping quality of the fruits.

Having thus described our invention, we claim as new and desire to secure by Letters Patent:

1. A machine for extracting essential oils from citrus fruits, comprising a traveling pressing device and a fixed puncturing device, the fruits being rolled along between the said devices by the action of the said traveling and pressing device for puncturing and pressing the cells in the outer skins of the fruits to expel the oil contained in the cells.

2. A machine for extracting essential oils from citrus fruits, comprising a weighted traveling pressing device and a fixed puncturing device arranged parallel with the said pressing device, and a feeding device for feeding the fruits one by one between the said devices at one end thereof to be rolled along between the said devices by the action of the said weighted traveling and pressing device and the said fruits having their skins punctured and pressed by the said traveling and pressing device and the said fixed puncturing device to expel the oils contained in the cells of the skins.

3. A machine for extracting essential oils from citrus fruits, comprising a weighted traveling pressing device and a fixed puncturing device arranged parallel with the said pressing device, a feeding device for feeding the fruits one by one between the said devices at one end thereof to be rolled along between the said devices and their skins being punctured and pressed to expel the oils contained in the cells of the skins, a chute at the other end of the said devices for the reception of the fruits, and water jets at the said chute to wash off the oil adhering to the surfaces of the fruits during the latter's passage down the chute.

4. A machine for extracting essential oils from citrus fruits, comprising a fixed puncturing device having puncturing means and a trough, an endless traveling slat belt having one of its runs arranged in close proximity and parallel with the said puncturing means, and a feeding device for feeding the fruits singly between the said puncturing means and the endless belt for the latter to roll the fruits along and press the same into contact with the said puncturing means to puncture the cells in the skins of the fruits and to press the oil out of the said cells, the oil passing into the said trough.

5. A machine for extracting essential oils from citrus fruits, comprising a fixed puncturing device having puncturing means and a trough, an endless traveling slat belt having one of its runs arranged in close proximity and parallel with the said puncturing means, the said puncturing means and belt being inclined, and a feeding device for feeding the fruits singly between the said puncturing means and belt at the lower end thereof, and a chute leading from the upper end of the said puncturing means for carrying off the fruits.

6. A machine for extracting essential oils from citrus fruits, comprising a fixed puncturing device having puncturing means and a trough, an endless traveling belt having one of its runs arranged in close proximity and parallel with the said puncturing means, the said puncturing means and belt being inclined, a feeding device for feeding the fruits singly between the said puncturing means and belt at the lower end thereof, a chute leading from the upper end of the said puncturing means for carrying off the fruits, and a spraying device at the said chute for spraying jets of water onto the fruits to wash off the oil from the surface of the fruits.

7. A machine for extracting essential oils from citrus fruits, comprising a fixed puncturing device having puncturing means and a trough, an endless traveling slat belt having one of its runs arranged in close proximity and parallel with the said puncturing means, the said puncturing means and belt being inclined, a feeding device for feeding the fruits singly between the said puncturing means and belt at the lower end thereof, a chute leading from the upper end of the said puncturing means for carrying off the fruits, a spraying device at the said chute for spraying jets of water onto the fruits to wash off the oil from the surface of the fruits, a receptacle at the end of the chute for the reception of the oil and water, and a circulating pump for pumping the water overflowing from the said receptacle to the said spraying device.

8. A machine for extracting essential oils from citrus fruits, comprising a fixed puncturing device having puncturing means and a trough, an endless traveling slat belt having one of its runs arranged in close proximity and parallel with the said puncturing means, the said puncturing means and belt being inclined, a feeding device for feeding the fruits singly between the said puncturing means and belt at the lower end thereof, a chute leading from the upper end of the said puncturing means for carrying off the fruits, a spraying device at the said chute for spraying jets of water onto the fruits to wash off the oil from the surface of the fruits, a receptacle at the end of the chute for receiving the water and oil from the chute, a tank, a discharge spout extending from the said receptacle and discharging into said tank, and a circulating pump connected with the said tank and the said spraying device to pump water from the tank to the said spraying device.

9. A machine of the class described provided with a feeding device, comprising a hopper, a narrow chute leading from the hopper, and a wide chute below the said narrow chute and extending in an opposite direction, any overflow from the said narrow chute dropping into the said wide chute, which latter carries the overflow in a reverse direction.

10. A machine for extracting essential oils from citrus fruits, comprising a weighted traveling pressing device and a fixed puncturing device arranged parallel with the said pressing device, and a feeding device for feeding the fruits one by one between the said devices at one end thereof to be rolled along between the said devices and their skins being punctured and pressed to expel the oils contained in the cells of the skins, the said feeding device having a hopper, a chute leading from the hopper, and a pivoted weighted shoe made segmental and arranged between the end of the said chute and the beginning of the said devices.

11. A machine for extracting essential oils from citrus fruits, comprising a fixed grate having puncturing means, and an endless traveling slat belt having one of its runs arranged in close proximity and parallel with the said grate to form a pressing run, the said slat belt having pressing plates on each slat, and the plates of one slat overlapping the plates on the next following slat.

12. A machine for extracting essential oils from citrus fruits, comprising a fixed grate having puncturing means, an endless traveling slat belt having one of its runs arranged in close proximity and parallel with the said grate to form a pressing run, and rollers bearing on the said pressing run.

13. A machine for extracting essential oils from citrus fruits, comprising a fixed grate having puncturing means, an endless traveling slat belt having one of its runs arranged in close proximity and parallel with the said grate to form a pressing run, rollers bearing on the said pressing run, and bearings for the axles of the said rollers to slide up and down and to turn in.

14. A machine for extracting essential oils from citrus fruits provided with a puncturing device comprising a frame, a shaft carrying the said frame, a plurality of troughs attached to the said frame, and a grate spanning the said trough and having puncturing ribs.

15. A machine for extracting essential oils from citrus fruits, comprising an endless pressing and traveling device and a puncturing device having a turnable frame, and a plurality of troughs each having a grate provided with puncturing ribs, and each adapted to be moved into co-active position with the said pressing and traveling device.

16. A machine for extracting essential oils from citrus fruits, comprising surfaces between which pass the citrus fruits, one of the surfaces having puncturing means and the other surface being weighted, movable and flexible to roll the fruits along and to press the same into contact with the puncturing means.

17. A machine for extracting essential oils from citrus fruits, comprising means for rolling the fruit along, means for subjecting the fruit to pressure, and means for puncturing the fruits while being rolled and pressed.

In testimony whereof we have signed our names to this specification in the presence of two subscribing witnesses.

WALTER ADOLPH DENISON ALLPORT.
THOMAS JOSEPH WILLIAM CRAMOND DAVENPORT.

Witnesses:
   A. G. S. DAVENPORT,
   K. L. BURTON.

---

Copies of this patent may be obtained for five cents each, by addressing the "Commissioner of Patents, Washington, D. C."